US012265057B2

(12) United States Patent
Yang et al.

(10) Patent No.: US 12,265,057 B2
(45) Date of Patent: Apr. 1, 2025

(54) MONITORING RADICAL PARTICLE CONCENTRATION USING MASS SPECTROMETRY

(71) Applicant: MKS Instruments, Inc., Andover, MA (US)

(72) Inventors: Chenglong Yang, Fremont, CA (US); Jimmy Liu, San Jose, CA (US); James Edward Blessing, Morgan Hill, CA (US)

(73) Assignee: MKS INSTRUMENTS, INC., Andover, MA (US)

( * ) Notice: Subject to any disclaimer, the term of this patent is extended or adjusted under 35 U.S.C. 154(b) by 0 days.

(21) Appl. No.: 18/621,600

(22) Filed: Mar. 29, 2024

(65) Prior Publication Data

US 2024/0264116 A1     Aug. 8, 2024

Related U.S. Application Data

(63) Continuation of application No. 17/644,704, filed on Dec. 16, 2021, now Pat. No. 11,971,386.

(60) Provisional application No. 63/130,257, filed on Dec. 23, 2020.

(51) Int. Cl.
  *G01N 27/623* (2021.01)
  *H01J 49/28* (2006.01)

(52) U.S. Cl.
  CPC .......... *G01N 27/623* (2021.01); *H01J 49/282* (2013.01)

(58) Field of Classification Search
  CPC .. H01J 49/04; H01J 49/10; H01J 49/24; H01J 49/0031; H01J 49/067; H01J 49/282; H01J 49/401; H01J 49/0422; H01J 49/0468; G01N 27/623
  See application file for complete search history.

(56) References Cited

U.S. PATENT DOCUMENTS

| 4,760,253 A | 7/1988 | Hutton |
| 7,591,923 B2 | 9/2009 | Mitrovic et al. |
| 7,977,649 B2 | 7/2011 | Hirano |

(Continued)

FOREIGN PATENT DOCUMENTS

| CN | 103715113 A | 4/2014 |
| KR | 10-2025873 B1 | 9/2019 |
| WO | 2010131007 A2 | 11/2010 |

OTHER PUBLICATIONS

Wu, T. F., et al. "Design and Implementation of Remote Plasma Sources for Semiconductor Chamber Cleaning." 2020 IEEE Energy Conversion Congress and Exposition (ECCE). IEEE, 2020.

(Continued)

*Primary Examiner* — David E Smith
*Assistant Examiner* — Hsien C Tsai
(74) *Attorney, Agent, or Firm* — Brian F. Swienton

(57) ABSTRACT

A monitoring system detects and measures a quantity of radical particles within a gas. A test chamber is coupled to a flow channel that transmits a gas. The test chamber defines an aperture connecting the test chamber and the flow channel, and the aperture permits a subset of the gas to enter the test chamber from the flow channel. An ionizer is positioned within the test chamber and generates radical ions from radical particles of the subset of the gas. A mass spectrometer measures a quantity of the radical ions, thereby providing a measurement of the radical particles in the gas.

20 Claims, 20 Drawing Sheets

(56) References Cited

U.S. PATENT DOCUMENTS

| | | | | |
|---|---|---|---|---|
| 8,785,843 | B2* | 7/2014 | Jones | H01J 49/067 |
| | | | | 313/363.1 |
| 9,640,379 | B2 | 5/2017 | Makarov et al. | |
| 10,319,649 | B2 | 6/2019 | Cho et al. | |
| 10,473,525 | B2 | 11/2019 | Meng et al. | |
| 10,685,819 | B2* | 6/2020 | Gopalan | G01N 21/31 |
| 10,903,060 | B2 | 1/2021 | Chung et al. | |
| 11,114,286 | B2 | 9/2021 | Lin et al. | |
| 11,430,643 | B2 | 8/2022 | Zhao et al. | |
| 11,791,147 | B2 | 10/2023 | Chung et al. | |
| 2011/0222058 | A1 | 9/2011 | Kim et al. | |
| 2014/0346952 | A1 | 11/2014 | Choi | |
| 2014/0374583 | A1 | 12/2014 | Prest et al. | |

OTHER PUBLICATIONS

Douai, D., J Berndt, and J Winter. "Quantitative analysis of the atomic nitrogen concentration in a remote plasma by means of mass spectrometry." Plasma Sources Science and Technology 11.1 (2002): 60.

Hori, M., et al., "Progress of radical measurements in plasmas for semiconductor processing," Plasma Sources Sci. Technol. 15, S74-S83 (2006).

Hiden HPR-60, "Molecule Beam Mass Spectrometer {MBMS} for the Quantitative Analysis of Reactive Gas Species, Hiden Analytical," www.HidenAnalytical.com (No Date Given).

Hiden EQP Series, "Mass/Energy Analysers for Plasma Diagnostics and Characterisation," Hiden Analytical, www.HidenAnalytical.com (No Date Given).

Benedikt, J., et al., "Threshold Ionization Mass Spectrometry of Reactive Species in Remote Ar/C2H2 Expanding Thermal Plasma," Journal of Vacuum Science and Technology A: Vacuum, Surfaces, and Films, 23(5), 1400-1412 (2005).

Foner, S.N., "High Sensitivity Mass Spectrometry of Transient Species," APL Technical Digest, 10(1), 2 (1970).

Lazovic, S., et al., "Mass Spectrometric Detection of N,O and NO Radicals and Ions Generated by a Plasma Needle," ISPC conference, 295 (2009).

Neufeld, L., "ICP-MS Interface Cones: Maintaining the Critical Interface between the Mass Spectrometer and the Plasma Discharge to Optimize Performance and Maximize Instrument Productivity," Spectroscopy, 34(7), 12-17 (2019).

Anonymous: "Inficon Minimized Fragmentation in RGA Data", Jan. 1, 2001 (Jan. 1, 2001), XP055911461, Retrieved from the Internet: URL:https://www.inficon.com/v1/attachment/dac6aeb8-1c77-4646-8f9c-12bae9613782 [retrieved on Apr. 11, 2022].

Anonymous: "Hiden EQP Series Mass/Energy Analysers for Plasma Diagnostics and Characterisation", May 1, 2020 (May 1, 2020), XP055911456, Retrieved from the Internet: URL :https://www.hidenanalytical.com/wp-contenl/uploads/2020/05/EQP-Introduction.pdf [retrieved on Apr. 11, 2022].

Notification of Transmittal of the International Search Report and Written Opinion issued for International Application No. PCT/US2021/072969, entitled "Monitoring Radical Particle Concentration Using Mass Spectrometry," pp. 1-13, mailed Apr. 25, 2022.

Anonymous: "EQP and EQS Analysers", Jun. 19, 2007 (Jun. 19, 2007), pp. 1-21, XP055911481, Retrieved from the internet: URL:https://www.hiden.de/wp-content/uploads/pdf/EQP_and_EQS_-_Hiden_Analytical_Techinical_Information.pdf [retrieved on Apr. 11, 2022].

* cited by examiner

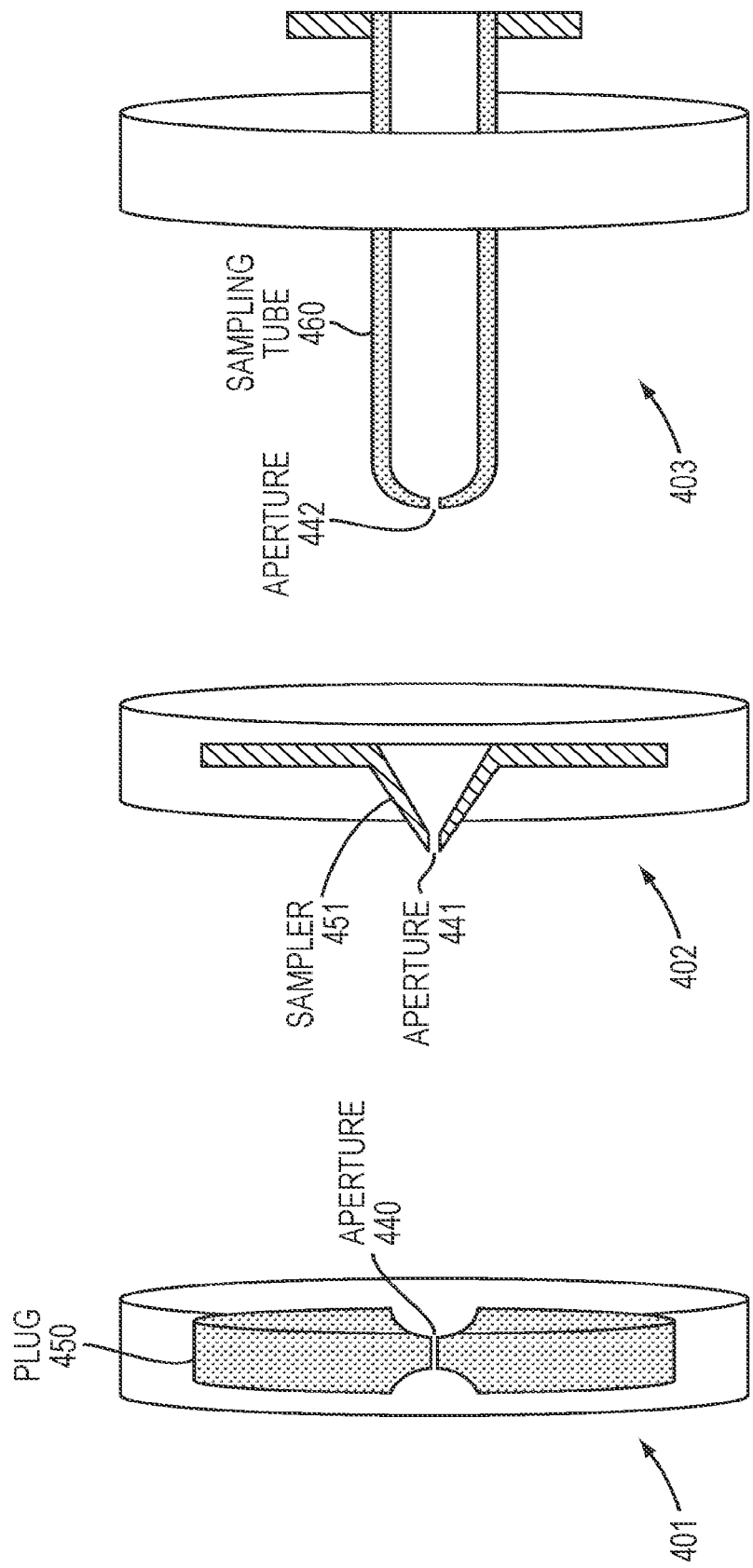

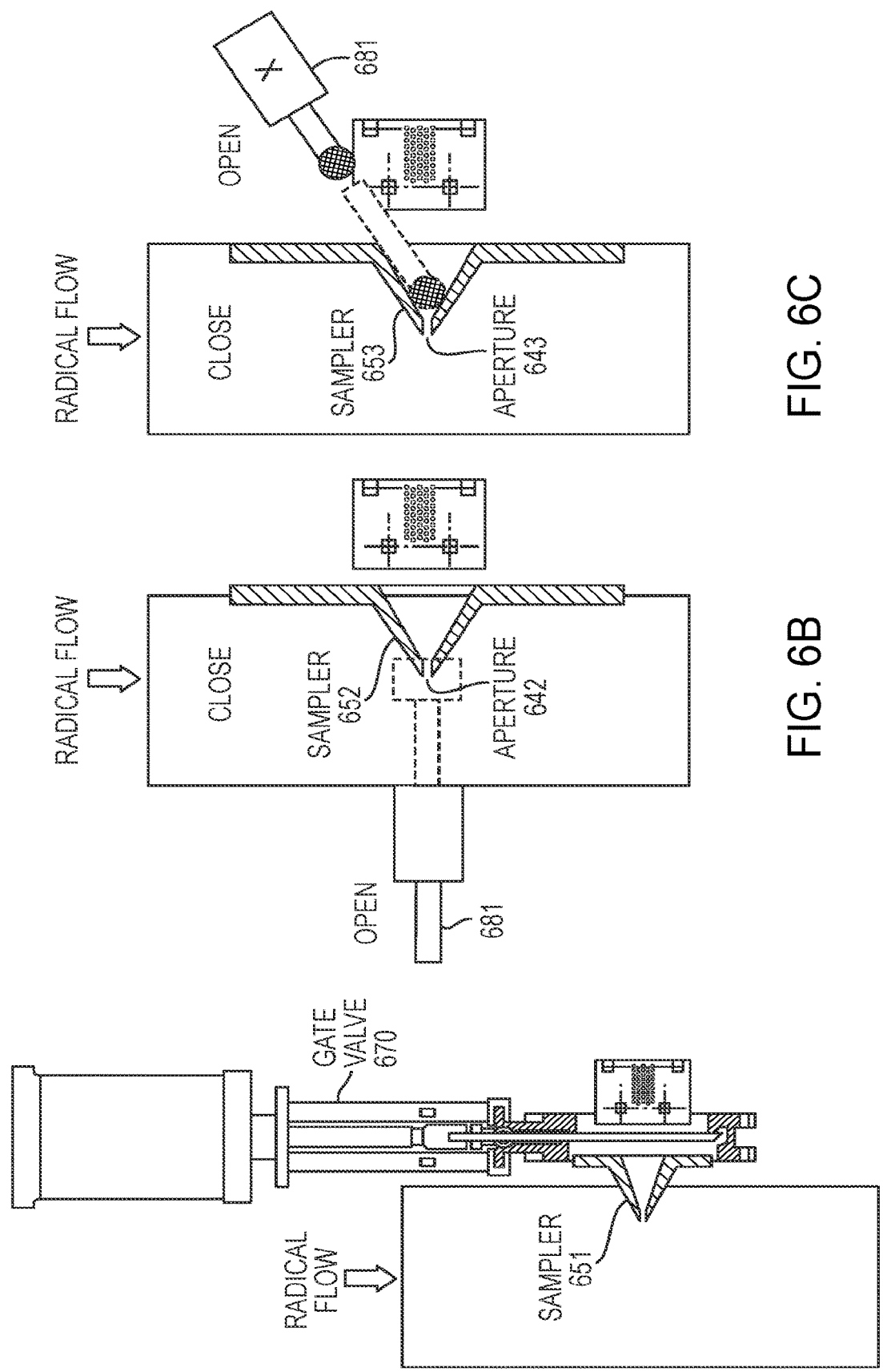

MONITORING RADICAL PARTICLE CONCENTRATION USING MASS SPECTROMETRY

CROSS-REFERENCE TO RELATED APPLICATIONS

This application is a continuation of U.S. patent application Ser. No. 17/644,704, filed Dec. 16, 2021, which claims the benefit of U.S. Provisional Application No. 63/130,257, filed on Dec. 23, 2020. The entire teachings of each of the above applications is incorporated herein by reference.

BACKGROUND

Remote plasma sources (RPS) have been widely used in semiconductor processing for the generation of radical particles. Recently, radical particles have been widely applied to semiconductor device fabrication, particularly in sub-20 nm process nodes, due to their advantages of avoiding charging or sputtering damages in etching and deposition processes. RPS systems, when implemented in semiconductor processing, can be operated consistently under the same parameters, including gas flow rates, powers, and pressures. However, even under common parameters, performance in deposition rate, etch rate and cleaning efficiency can vary significantly between operations due to a change in the concentration of radical particles. This change can occur following a maintenance cycle or during an extended operational cycle. As a result, performance in semiconductor processing can become unpredictable.

SUMMARY

Example embodiments include a system for monitoring radical particles, including a test chamber, an ionizer, and a mass spectrometer. The test chamber may be configured to be coupled to a flow channel adapted to transmit a gas. The test chamber may define an aperture connecting the test chamber and the flow channel, and the aperture may be configured to permit a subset of the gas to enter the test chamber from the flow channel. The ionizer may be positioned within the test chamber and may be configured to generate radical ions from radical particles of the subset of the gas. The mass spectrometer may be configured to measure a quantity of the radical ions.

The mass spectrometer may be a residual gas analyzer (RGA). The test chamber may be configured to maintain a gas pressure lower than a gas pressure at the flow channel. The gas pressure in the test chamber may be less than 1e−2 Torr, and the gas pressure in the flow channel may be greater than 0.01 Torr. The ionizer may be positioned within 4 inches of the aperture. The ionizer may be configured to operate at a low-energy state to generate the radical ions and minimize generation of non-radical ions, the low-energy state being lower than an energy state associated with the generation of the non-radical ions. The ionizer may be configured to operate at a plurality of low-energy states, each of the plurality of low-energy states corresponding to a respective radical particle. The ionizer may be configured to operate at a high-energy state to enable acquisition of a reference signal based on non-radical particles of the subset of the gas. The aperture may have a diameter of less than 1 millimeter. The aperture may permit passage, to the test chamber, a ratio of radical particles to non-radical particles that is greater than 0.1% of the ratio present in the gas within the flow channel.

A protrusion of the test chamber may extend into the flow channel and encompass a volume of the test chamber, the aperture being positioned at the protrusion. The protrusion may exhibit a substantially conical shape, the aperture being positioned at a point of the conical shape. The ionizer may be positioned to generate radical ions within a volume defined by the conical shape. The conical shape may be configured as an electrostatic element of the ionizer. An electrostatic lens may be configured to direct the radical ions as a beam towards the mass spectrometer.

A controller may be configured to control operation of a radical particle source based on the quantity of the radical ions measured by the mass spectrometer. This control may include controlling at least one of 1) quantity of radical particle generation over a given time and 2) a time period in which the radical particles are generated. This control may also include controlling at least one of power, gas flow, gas pressure, and temperature of a wetted path of the flow channel of the radical source. This control may also include controlling the tool process.

A stopper may be configured to selectively seal the aperture. A surface encompassing the aperture may be non-metal and exhibit a reactivity and recombination coefficient for the radical particles that is lower than that of a metal surface. Alternatively, a surface encompassing the aperture may be metallic and exhibit low reactivity with the radical particles. The flow channel may be a conduit extending from a radical source to a process chamber, a region down-stream of a reaction zone in a process chamber, or a conduit down-stream of a process chamber.

Further embodiments include a method of monitoring radical particles. A subset of a gas from a flow channel may be directed to a test chamber via an aperture connecting the test chamber and the flow channel. Via an ionizer, radical ions may be generated from radical particles of the subset of the gas. Via a mass spectrometer, a quantity of the radical ions may then be measured.

The mass spectrometer may be a residual gas analyzer (RGA). The test chamber may be controlled to maintain a gas pressure lower than a gas pressure at the flow channel. The gas pressure in the test chamber may be less than 1e−2 Torr, and the gas pressure in the flow channel may be greater than 0.01 Torr. The ionizer may be positioned within 4 inches of the aperture. The ionizer may be operated at a low-energy state to generate the radical ions and minimize generation of non-radical ions, the low-energy state being lower than an energy state associated with the generation of the non-radical ions. The ionizer may be operated at a plurality of low-energy states, each of the plurality of low-energy states corresponding to a respective radical particle. The ionizer may be operated at a high-energy state to enable acquisition of a reference signal based on non-radical particles of the subset of the gas. The aperture may have a diameter of less than 1 millimeter. Via the aperture, passage may be permitted, to the test chamber, a ratio of radical particles to non-radical particles that is greater than 0.1% of the ratio present in the gas within the flow channel.

A protrusion of the test chamber may extend into the flow channel and encompass a volume of the test chamber, the aperture being positioned at the protrusion. The protrusion may exhibit a substantially conical shape, the aperture being positioned at a point of the conical shape. Via the ionizer, radical ions may be generated within a volume defined by the conical shape. The conical shape may be configured as an electrostatic element of the ionizer. Via an electrostatic lens, the radical ions may be directed as a beam towards the mass spectrometer.

Via a controller, operation of a radical particle source may be controlled based on the quantity of the radical ions measured by the mass spectrometer. This control may include controlling at least one of 1) quantity of radical particle generation over a given time and 2) a time period in which the radical particles are generated. This control may also include controlling at least one of power, gas flow, gas pressure, and temperature of a wetted path of the flow channel of the radical source. This control may also include the tool process control.

The aperture may be selectively sealed via a stopper. A surface encompassing the aperture may be non-metal and exhibit a reactivity and recombination coefficient for the radical particles that is lower than that of a metal surface. Alternatively, a surface encompassing the aperture may be metallic and exhibit low reactivity with the radical particles. The flow channel may be a conduit extending from a radical source to a process chamber, a region down-stream of a reaction zone in a process chamber, or a conduit down-stream of a process chamber.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 4A-C are diagrams of inlet ports that can be implemented with a radical particle monitor.

FIGS. 6A-C illustrate example configurations implementing an aperture stopper.

DETAILED DESCRIPTION

A description of example embodiments follows.

Residual gas analyzers (RGAs) are a type of mass spectrometer that is typically designed for process control and contamination monitoring in vacuum systems. An RGA operates by ionizing separate components of the gas to create various ions, and then detects and determines the mass-to-charge ratios of those ions. A typical RGA is designed to detect stable chemical compounds. Radical particles, in contrast, typically undergo reactions before reaching the particle sampler of an RGA. Thus, such an RGA would fail to detect the presence of significant numbers of radical particles due to excessive loss.

Previous RGAs have implemented various techniques for ion sampling, including a pole bias mid-axis potential and negative ion capability. However, such RGAs do not provide a solution for radical detection in a semiconductor process chamber, especially for sampling radicals with the short lifetime and high recombination rate. Beyond mass spectrometers, various measurement methods of radicals have been developed, such as infrared diode laser absorption, spectroscopy, laser induced fluorescence spectroscopy, cavity ring down, and spectroscopy. Recently, atomic radicals have also been measured using compact vacuum ultraviolet absorption spectroscopy.

However, the above approaches suffer various drawbacks, including poor sensitivity to detect trace radicals, interference from other gas species, difficulty to achieve a stable baseline due to process condition changes, and the inability to quantify the radicals in the system. Thus, prior approaches are unable to monitor radical concentration accurately and reliably. Semiconductor processes therefore have a need for precise and accurate monitoring of radical concentrations in real-time in a process chamber. Such monitoring would be particularly advantageous for process control when applying radical on-wafer processes for advanced technology nodes.

Figure 1A:
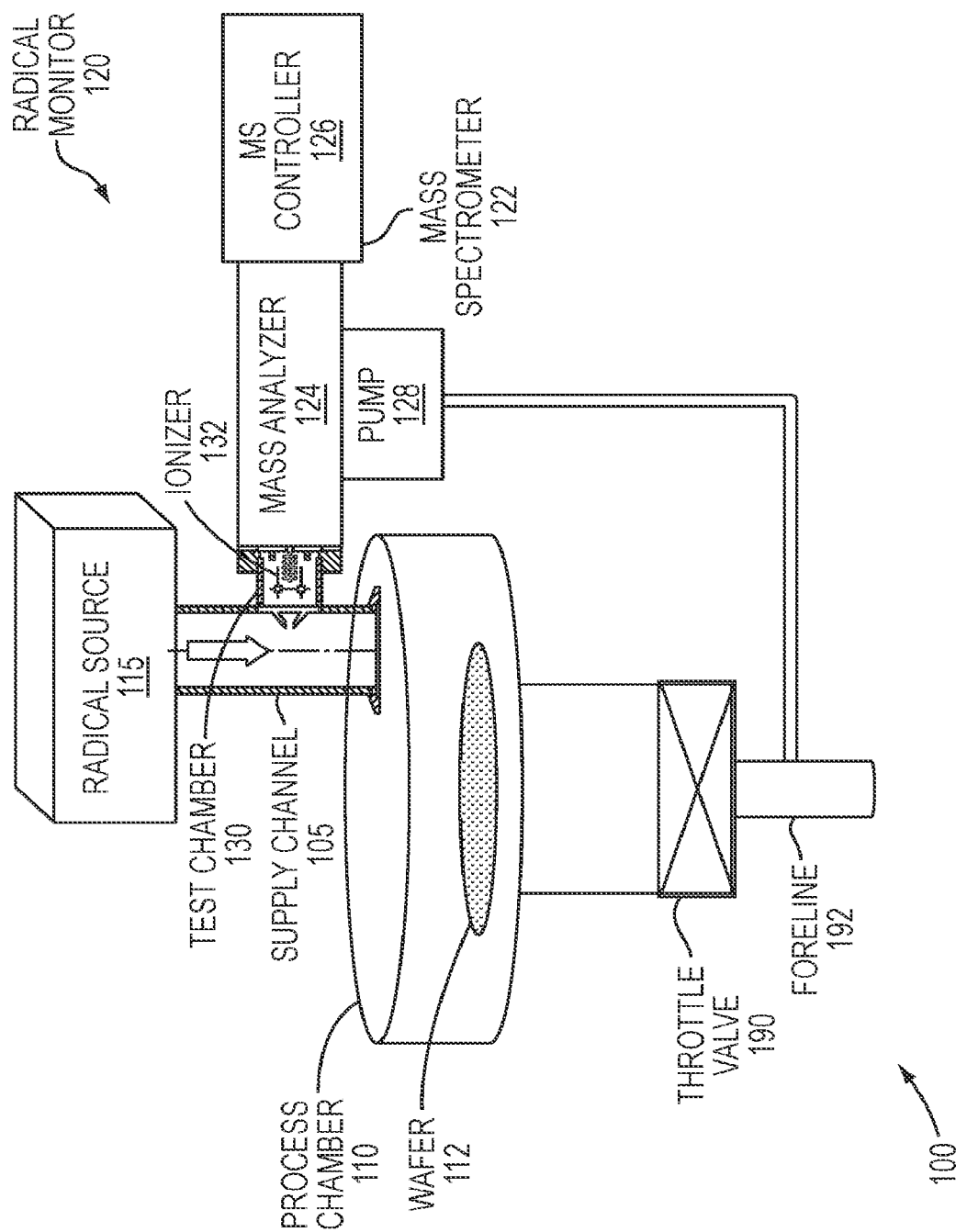
FIGS. 1A-F are diagrams of semiconductor processing systems implementing a radical particle monitor in example embodiments.

FIG. 1A depicts a semiconductor processing system 100 implementing a radical particle monitor 120 in an example embodiment. The system 100 includes a process chamber 110 in which a semiconductor wafer 112 is processed, such as in etching and/or deposition processes. To facilitate this processing, a radical source 115, such as a remote plasma source (RPS), a capacitively coupled plasma source (CCP), or an inductively coupled plasma source (ICP), can emit a gas into the process chamber 110 via a supply channel 105, which may be straight, curved, or angled, such as an elbow. Depending on the desired process, the gas may have one of a number of different compositions of stable particles, radical particles, and ions (e.g., a plasma gas). A throttle valve 190 can be selectively opened to pass the gas from the process chamber 110 to a foreline 192, wherein the gas may then be exhausted from the system 100 or collected for further use.

A radical particle monitor (RPM) 120 operates to monitor the presence of radical particles in the gas. The RPM 120 may include a test chamber 130, an ionizer 132, and a mass spectrometer 122. The test chamber 130 may be coupled to a gas flow channel, such as the supply channel 105, to receive a subset of the gas to the test chamber 130. The point of coupling may be on a straight, curved, or angled portion of the flow channel 105. The ionizer 132, positioned within the test chamber 130, may be configured to ionize the radical particles of the subset of the gas to generate radical ions within the test chamber 130. The mass spectrometer 122 may be a residual gas analyzer (RGA) or comparable system, and may include a mass analyzer 124, a controller 126, and a pump 128. The mass analyzer 124 may receive the radical ions from the ionizer 132 and perform mass filtering and ion detection on the radical ions to measure the presence of the radical ions. The controller 126 may then process the measurements from the mass analyzer 124 to generate further results, such as a mass spectrum of the gas, and may be further configured to control operation of the radical source 115 or other parameters of the system 100 based on the results. The pump 128 (e.g., a vacuum or turbo pump) can operate to pump gas from the mass analyzer 124 and test chamber 130 to maintain the chambers at an appropriate pressure (e.g., less than 1e–2 torr), transferring the gas to the foreline 192 or another exhaust.

In contrast to typical mass spectrometers, such as RGAs, the RPM 120 provides for reliable measurement of radical particles within a gas. This capability can be enabled by several features described herein, which can be implemented in various combinations as provided below. In particular, the test chamber 130 may be adapted to capture an optimal sample of the gas while minimizing reaction of the radical particles that enter the test chamber 130. The ionizer 132 may also be configured to maximize ionization of the radical particles that enter the test chamber 130, directly. Various features of the test chamber 130, ionizer 132, and related elements are described below with reference to FIGS. 3A-F. Further, the mass spectrometer 122 may operate in one or more low energy states, as described below, to ionize and measure the radical particles without interference from non-radical particles. The RPM 120 may be further configured to provide multiple modes of operation to detect and measure the presence of different radical particles, as well as the presence of non-radical particles, for example by operating in different energy states as described below.

Figure 1B:
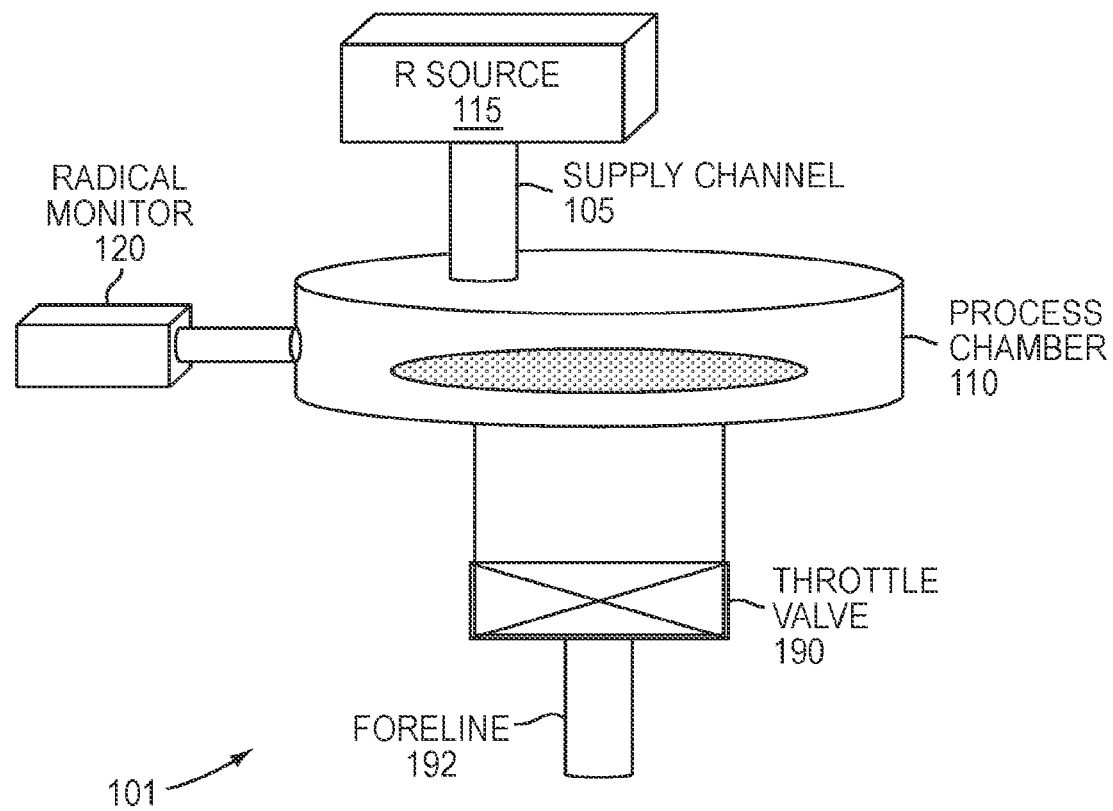
Figure 1C:
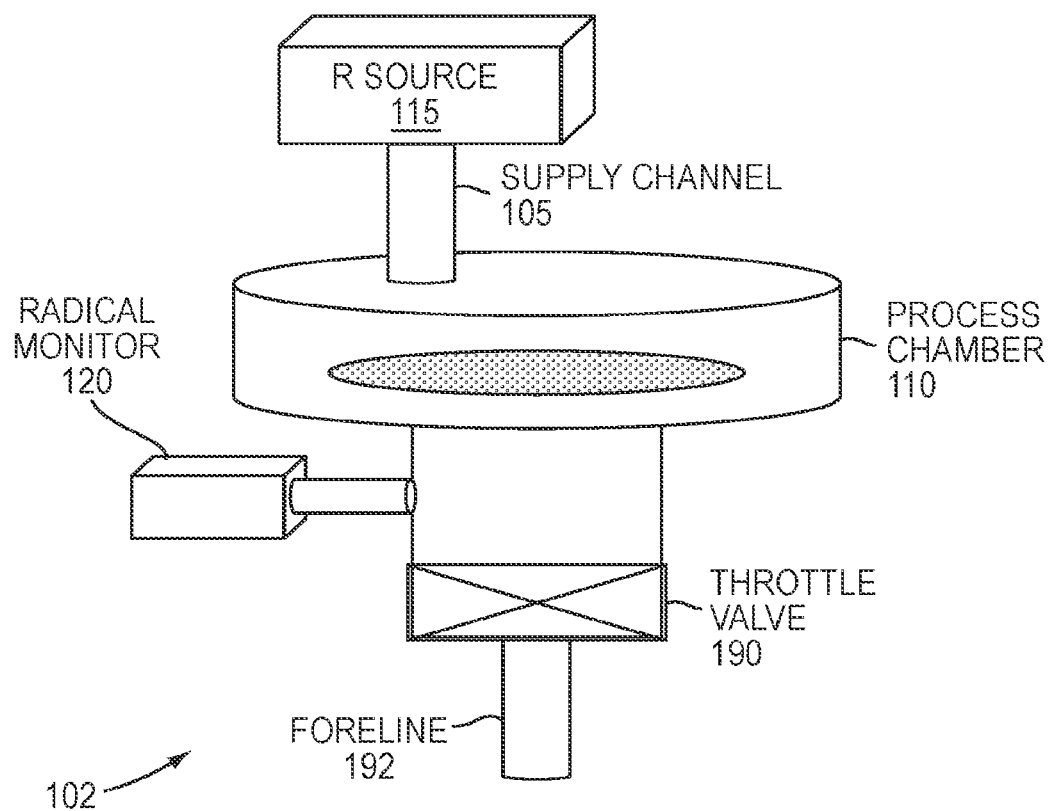
Figure 1D:
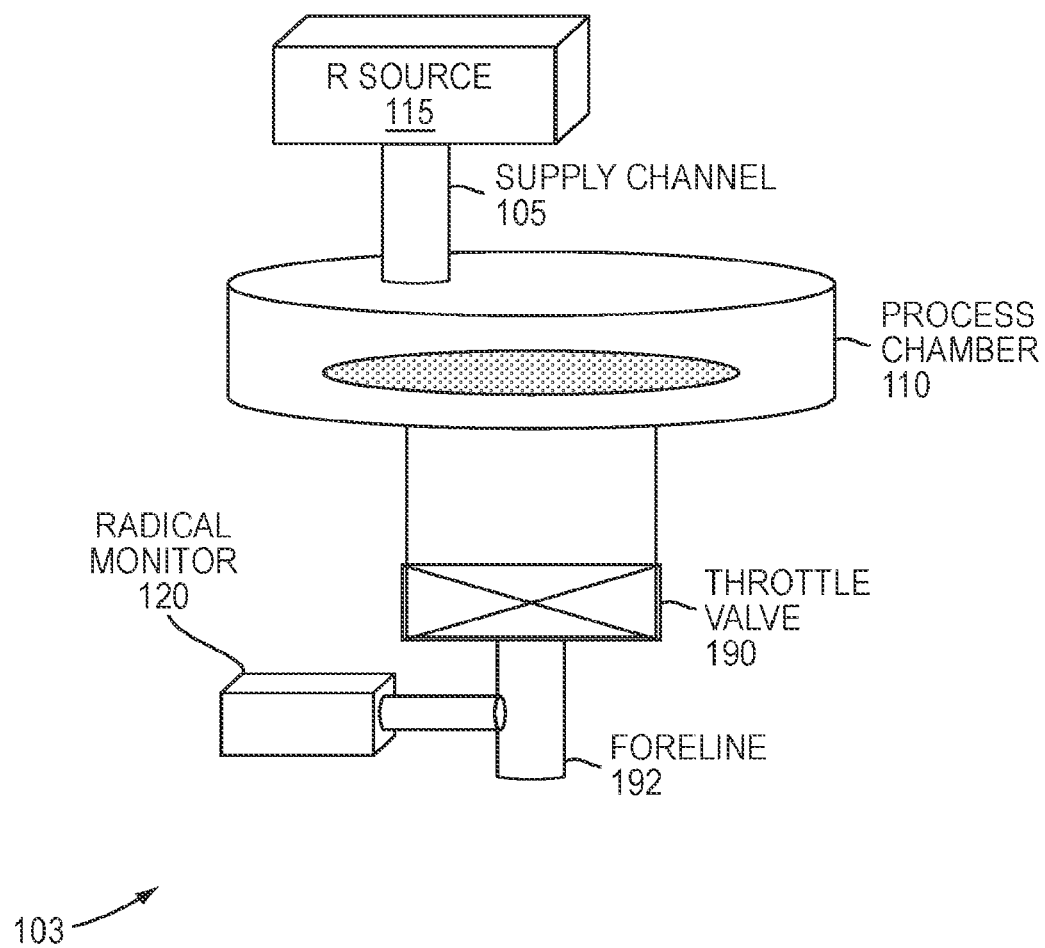

FIGS. 1B-D illustrate semiconductor processing systems 101-103 in further embodiments. The systems 101-105 may incorporate some or all features of the system 100 described above, except that they may implement a radical particle monitor and/or a radical source in different configurations. FIG. 1B shows a system 101 wherein the RPM 120 is coupled to a wall of the process chamber 110, configured to monitor the presence of radical particles in the process chamber. FIG. 1C shows a system 102 wherein the RPM 120 is coupled to a wall of the foreline 192 above the throttle valve 190, while FIG. 1D depicts a system 103 wherein the RPM 120 is coupled to the foreline 192 below the throttle valve 190.

For a given gas transmitted through the systems 100-103, the gas sampled by the RPM 120 may differ due to where the sample is collected. In particular, the radical concentration is likely to diminish with distance from the radical source 115, and the concentration of background gas and other particles may be altered after interacting with the wafer 112 and the interior surfaces confining the gas. For these reasons, the RPM 120 may be calibrated based on the sampling location, and/or the measurements of the radical particles and other particles provided by the RPM 120 may be calculated based on the sampling location.

Figure 1E:
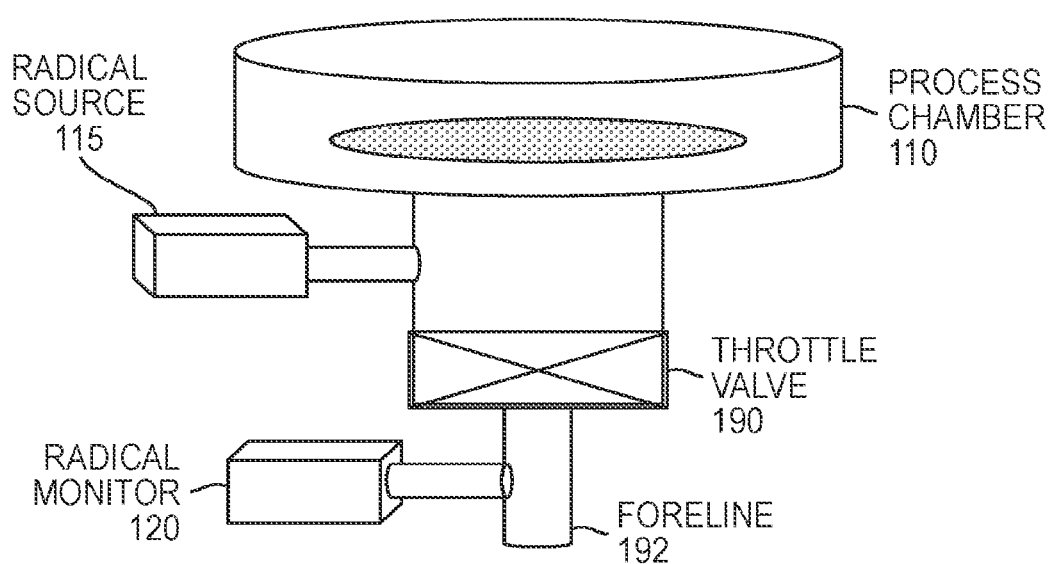
Figure 1F:
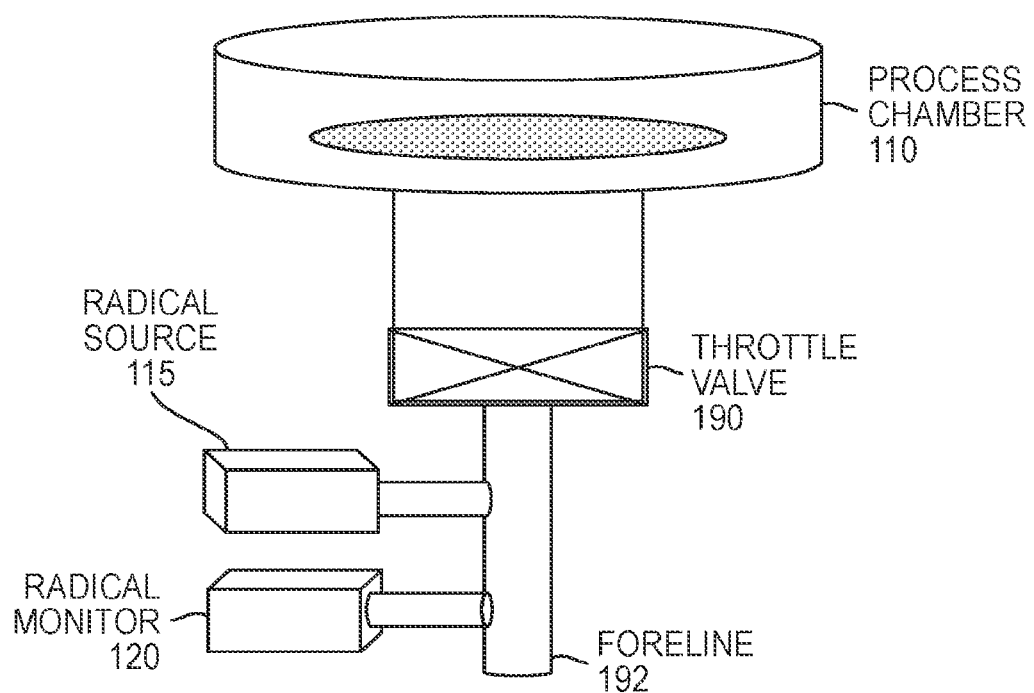

FIGS. 1E and 1F depict systems 104, 105 wherein the radical source 115 is positioned below the process chamber 110. In FIG. 1E, the radical source 115 is positioned at the foreline 192 above the throttle valve 190, while in FIG. 1F, the radical source 115 is positioned below the throttle valve 190. In such a configuration, the radical source 115 may be operated during maintenance cycles to emit radical particles for cleaning the throttle valve 190 and/or foreline 192. To monitor the presence of radical particles (and optionally, non-radical particles) in the gas, the RPM 120 may be coupled to the foreline 192 downstream from the radical source 115. Measurements captured by the RPM 120 may be used to determine the status and progress of the maintenance cycle, as well as to control the operation of the radical source 115, such as gas flow and pressure, radical particle generation, temperature, and length of the maintenance cycle.

Figure 2A:
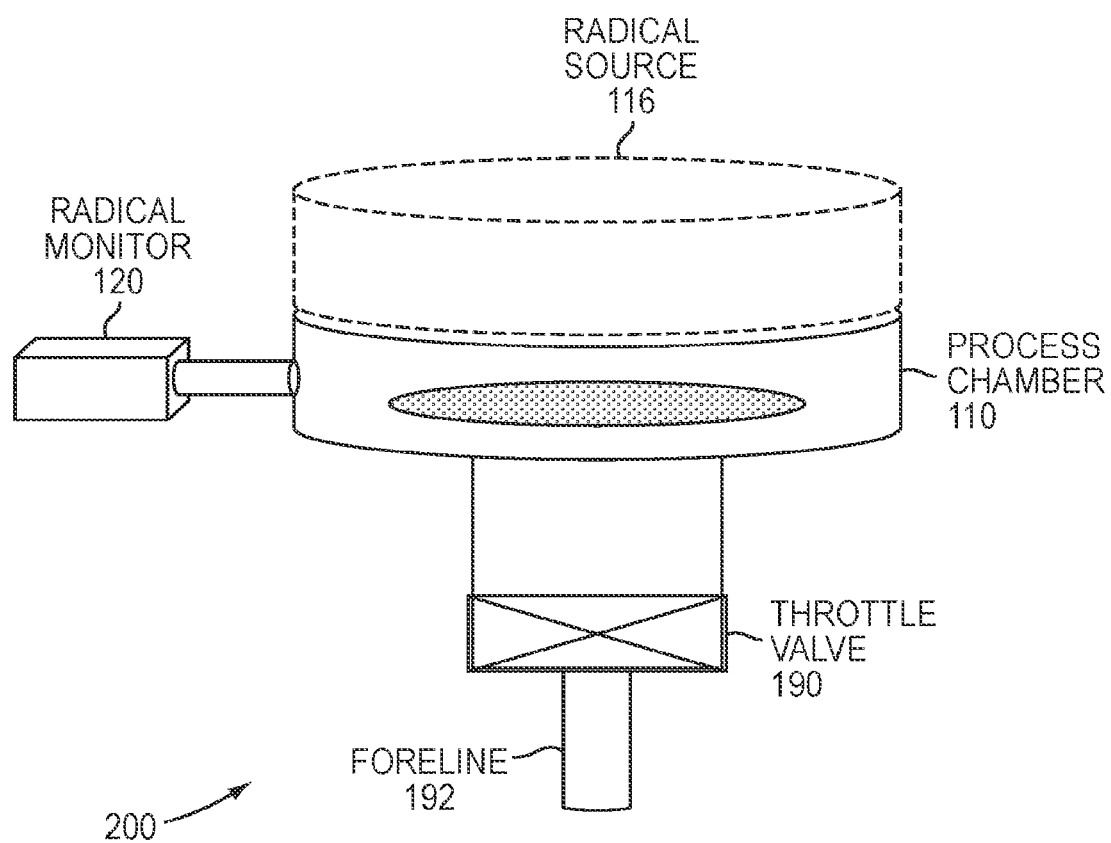
FIGS. 2A-C are diagrams of semiconductor processing systems implementing a radical particle monitor in further embodiments.
Figure 2B:
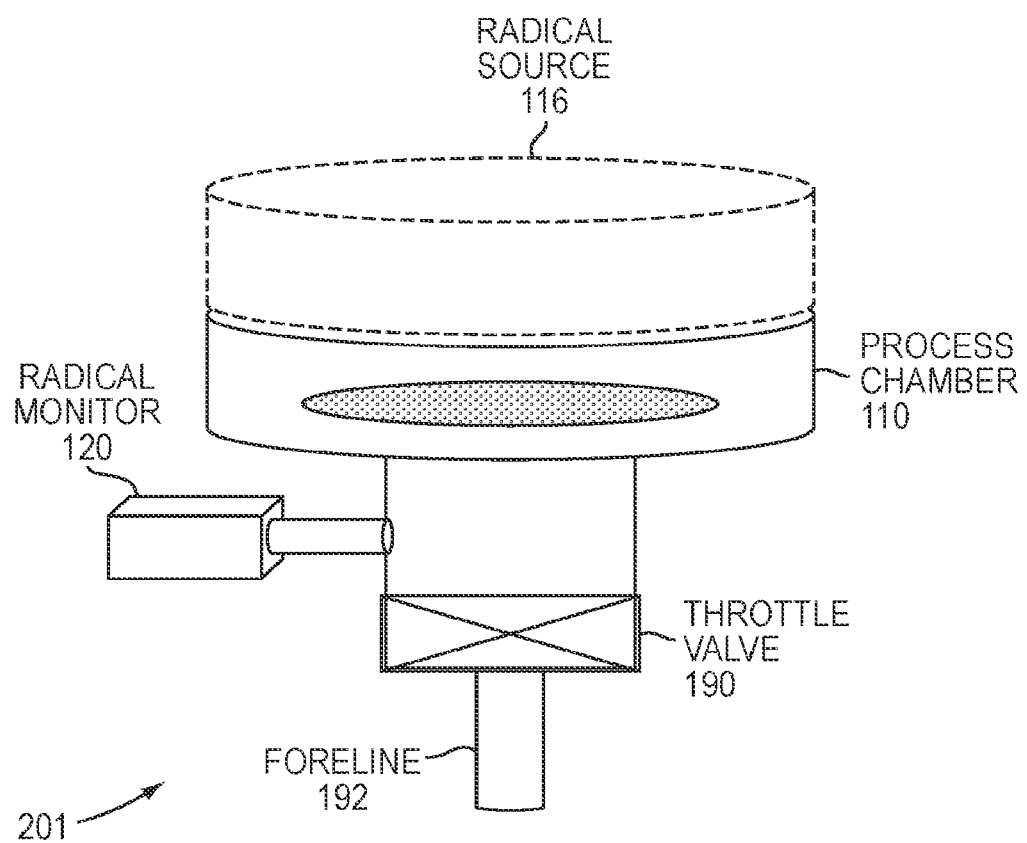
Figure 2C:
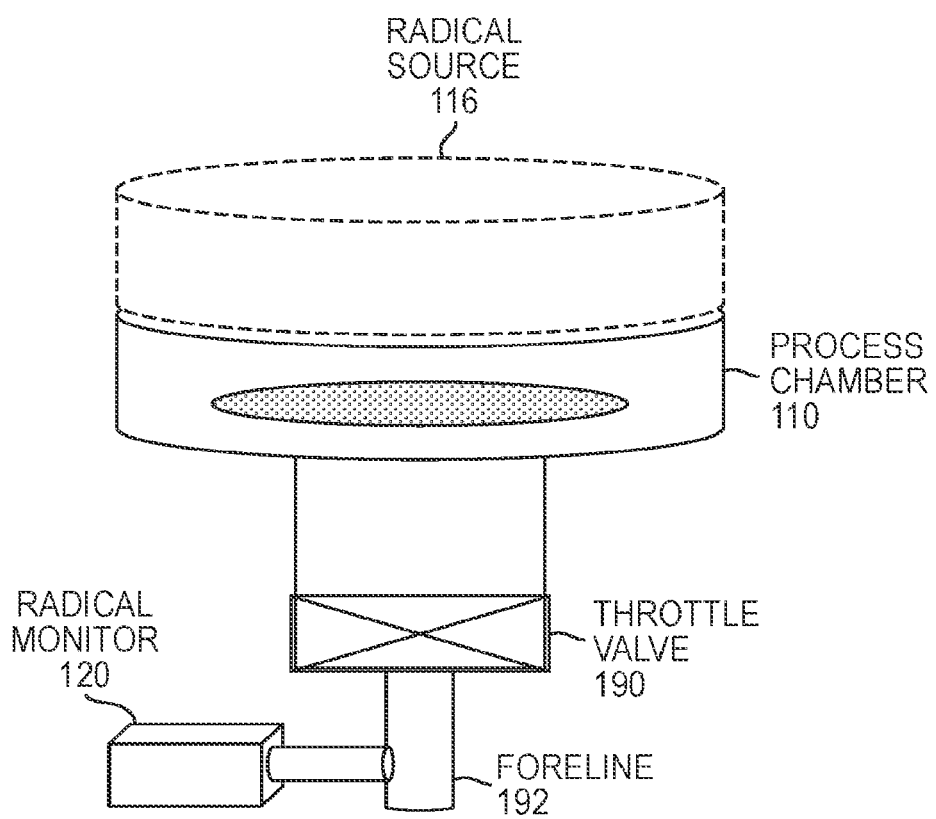

FIGS. 2A-C illustrate semiconductor processing systems 200-202 in further embodiments. The systems 200-202 may incorporate some or all features of the system 100 described above, except that they implement a radical particle source 116, such as a capacitively coupled plasma source (CCP), or an inductively coupled plasma source (ICP) in place of (or in addition to) a radical source 115 as described above. The radical particle source 116 may occupy an upper volume of the process chamber 110, or may be contained in a separate chamber adjacent to the process chamber 110. Due to this configuration, a supply channel may not be available for sampling the radical particles. Accordingly, the RPM 120 may instead be coupled to a wall of the process chamber 110, as shown in FIGS. 2A, and may be configured to monitor the presence of radical particles in the process chamber 110. Alternatively, the RPM 120 may be coupled to a wall of the foreline 192 above the throttle valve 190 as shown in FIG. 2B, or may be coupled to the foreline 192 below the throttle valve 190 as shown in FIG. 2C.

Figure 3A:
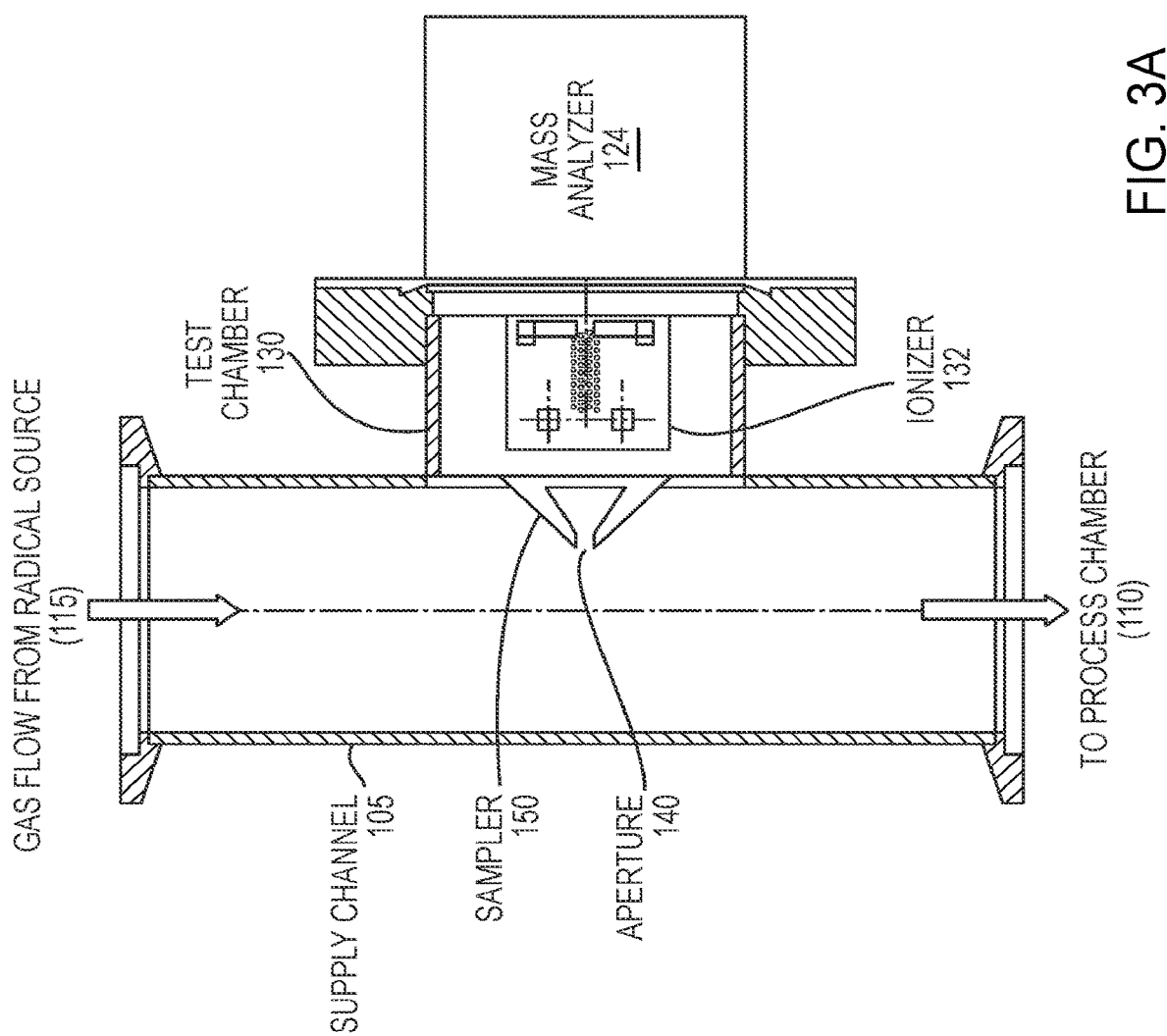
FIGS. 3A-F are diagrams of a subset of a radical particle monitor in example embodiments.

FIG. 3A illustrates a portion of the RPM 120 in further detail. Here, the test chamber 130 is shown to be in gaseous communication with the supply channel 105 via an aperture 140. Although the supply channel 105 is shown, the test chamber 130 may instead be coupled to a different flow chamber such as process chamber 110 or foreline 192 as shown in FIGS. 1B-F and 2A-C. The aperture 140 may be sized such that it enables passage of an acceptable number of radical particles without reaction, while also maintaining a low gas pressure within the test chamber to facilitate particle detection. For example, if the mass analyzer 124 is configured as an RGA, then the test chamber 130 may be required to maintain a pressure of less than 1e-2 torr, despite the supply channel maintaining a pressure in the range of 0.01-10 torr. In such an application, the aperture 140 may have a diameter of less than 1 millimeter, and, in one example, may have a diameter of approximately 35 µm. The aperture 140, configured as described herein, may permit passage, to the test chamber 130, a quantity of the radical particles that is suitable for detection by the mass spectrometer 122 without excessive losses. This result may be expressed as a ratio of radical particles to non-radical particles that is present in the gas in the test chamber 130 in contrast to the ratio present in the gas in the supply channel 105. For example, the aperture 140 may permit passage, to the test chamber 130, a ratio of radical particles to non-radical particles that is greater than 0.1% of the ratio present in the gas within the supply channel 105. In further embodiments, the ratio present in the test chamber 130 may be 1% or greater than the ratio present in the supply channel 105 or another flow channel to which the test chamber 130 is coupled, such as the process chamber 110 or foreline 192 as shown in FIGS. 1B-F.

When radical particles are transported through the supply channel 105, the radicals near the wall of the supply channel 105 may collide with the wall surface frequently, having a high recombination rate and leading to the loss of the radical particles. Therefore, the density of the radical particles near the wall may be relatively low and not representative of the true population of radical particles being delivered from the radical source 115. Thus, sampling the radical particles near the wall of the supply channel 105 with an aperture on the wall, as described below, may not have an optimal efficiency of radical sampling.

A cone-shaped sampler 150, with the aperture 140 positioned at the end of the sampler 150, extends the sample point nearer to the center of the gas stream from the radical source 115, where the species sampled may have experienced fewer surface collisions. Such a sampling location may have the much higher radical density than a sampling location at the wall of the supply channel 105. Further, the ionizer 132 may be positioned in close proximity to the sampler 150 (e.g., within 4 inches, and within 0.5 inches in the example shown) to increase detection sensitivity by intercepting a larger fraction of the line-of-sight cone of radicals expanding into the test chamber 130 after passing through the aperture 140. The conical shape of the sampler 150 also minimizes collisions with radical particles that pass through the aperture 140 by allowing the particles a wider path at the entrance of the test chamber 130. Alternatively, the sampler 150 may form a protrusion defining one of a range of different shapes, such as a semi-sphere, a cylinder, a prism, or an elliptical or oval shape. In such alternatives, the protrusion may extend into the supply channel 105 or another flow channel, and may encompass a volume of the test chamber 130, wherein the aperture 140 is positioned at an end or another surface of the protrusion. The sampler 150 may have a non-metal surface composed of glass, quartz, sapphire, SiO2, Al2O3, or another material that exhibits a low recombination rate (relative to metal surfaces) with a given set of radical particles to be measured, such as radical particles of H, N, O, OH, NHx, CHx, and NO. Alternatively, the sampler 150 may have a metal surface composed of aluminum or stainless steel or aluminum nitride or aluminum oxide, or another material that exhibits a low reaction rate (relative to non-metal surfaces) with a given set of radical particles to be measured, such as radical particles of F, Cl, $NF_x$, and $CF_x$.

The above features, along with a high vacuum (e.g., 1e–5 torr) in the test chamber 130, can enable a long mean free path for particles within the test chamber 130. Thus, a large portion of the radical particles that travel through the aperture 140 will reach the ionizer 132 before colliding with a wall or another particle, leading to a higher chance of radical ionization. A combination of some or all of the above features, including extending the aperture 140 into the supply channel 105, enabling clearance for free radicals via the cone-shaped sampler 150, and positioning the ionizer 132 close to aperture 140, can enable the ionizer 132 to generate more radical ions from the radical particles, thereby providing the mass analyzer 124 with greater sensitivity for radical detection.

Figure 3B:
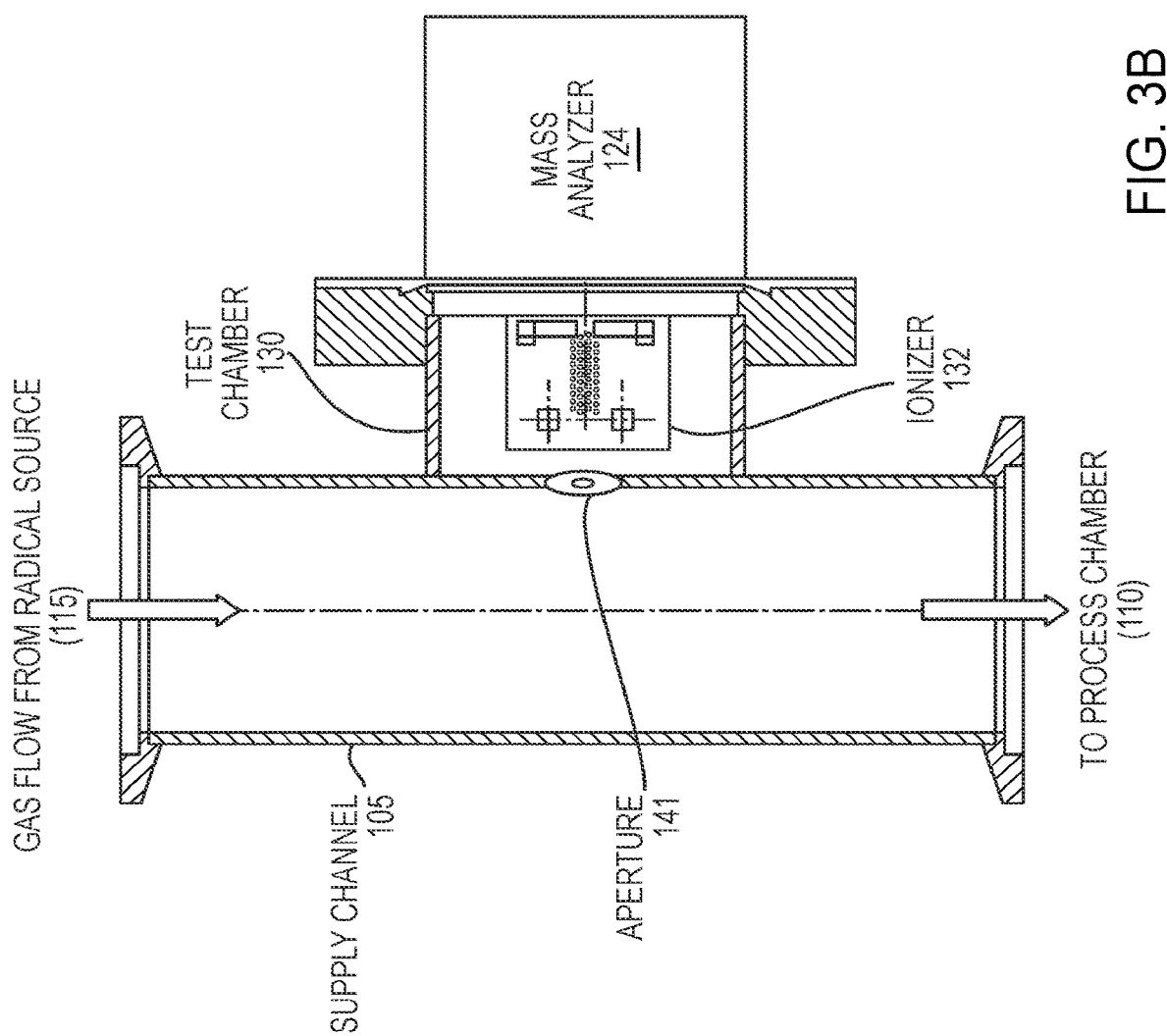

FIGS. 3B-F illustrate a portion of the RPM 120 in further embodiments. The embodiments may include some or all features of the RPM 120 described above with reference to FIGS. 1A-3A, with the exception that the interface between the supply channel 105 (or other flow channel) and the test chamber 130 is configured as described below. FIG. 3B shows a configuration wherein the test chamber 130 and supply channel 105 share a common wall, and wherein an aperture 141 is located at the common wall without protrusion into the supply channel. The aperture 141 may be a prefabricated surface (e.g., a stainless-steel gasket) with an orifice that is installed (e.g., welded) at a larger opening in the common wall. Alternatively, the aperture 141 may be a simple orifice that is drilled through the common wall.

Figure 3C:
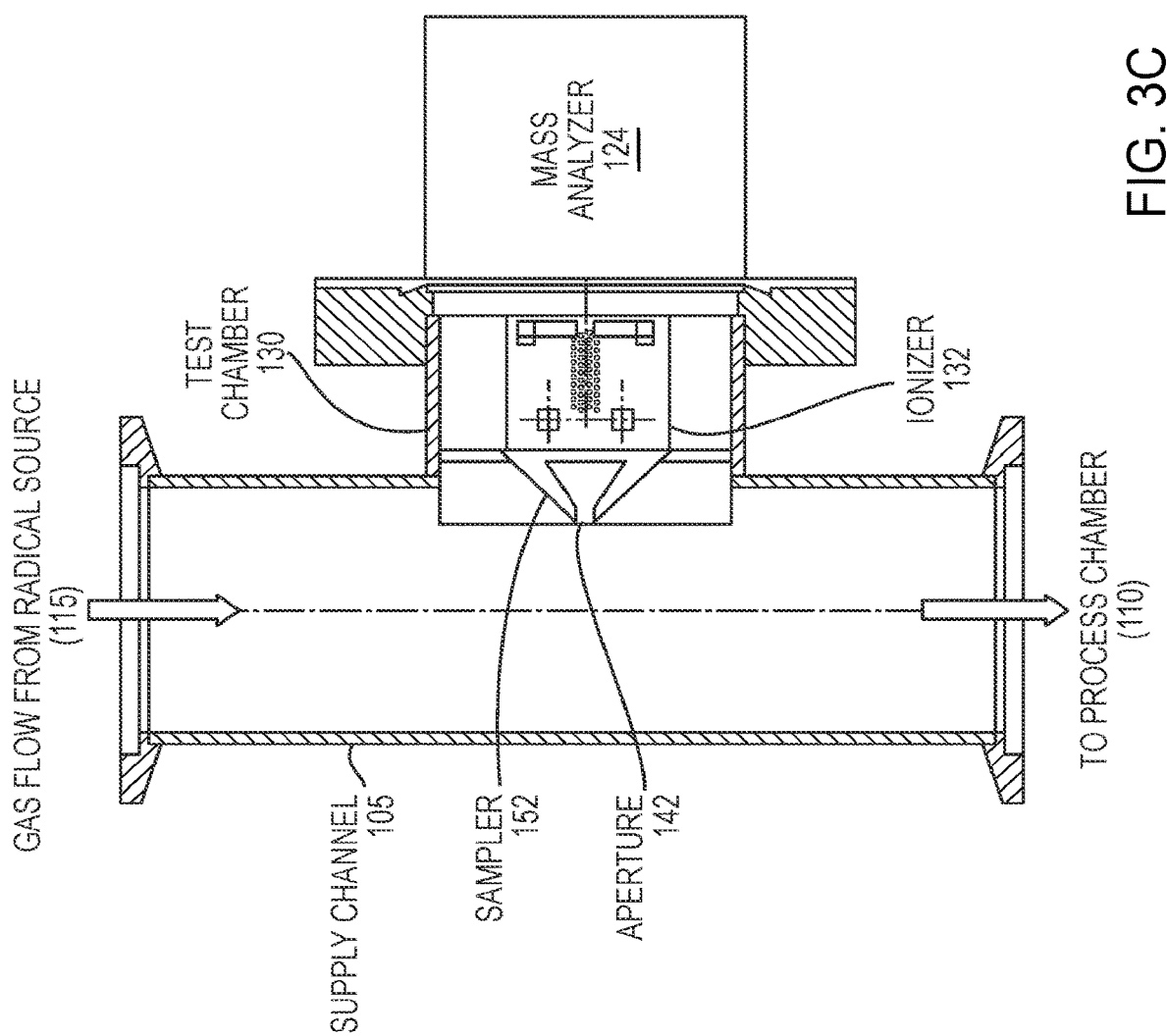
Figure 3D:
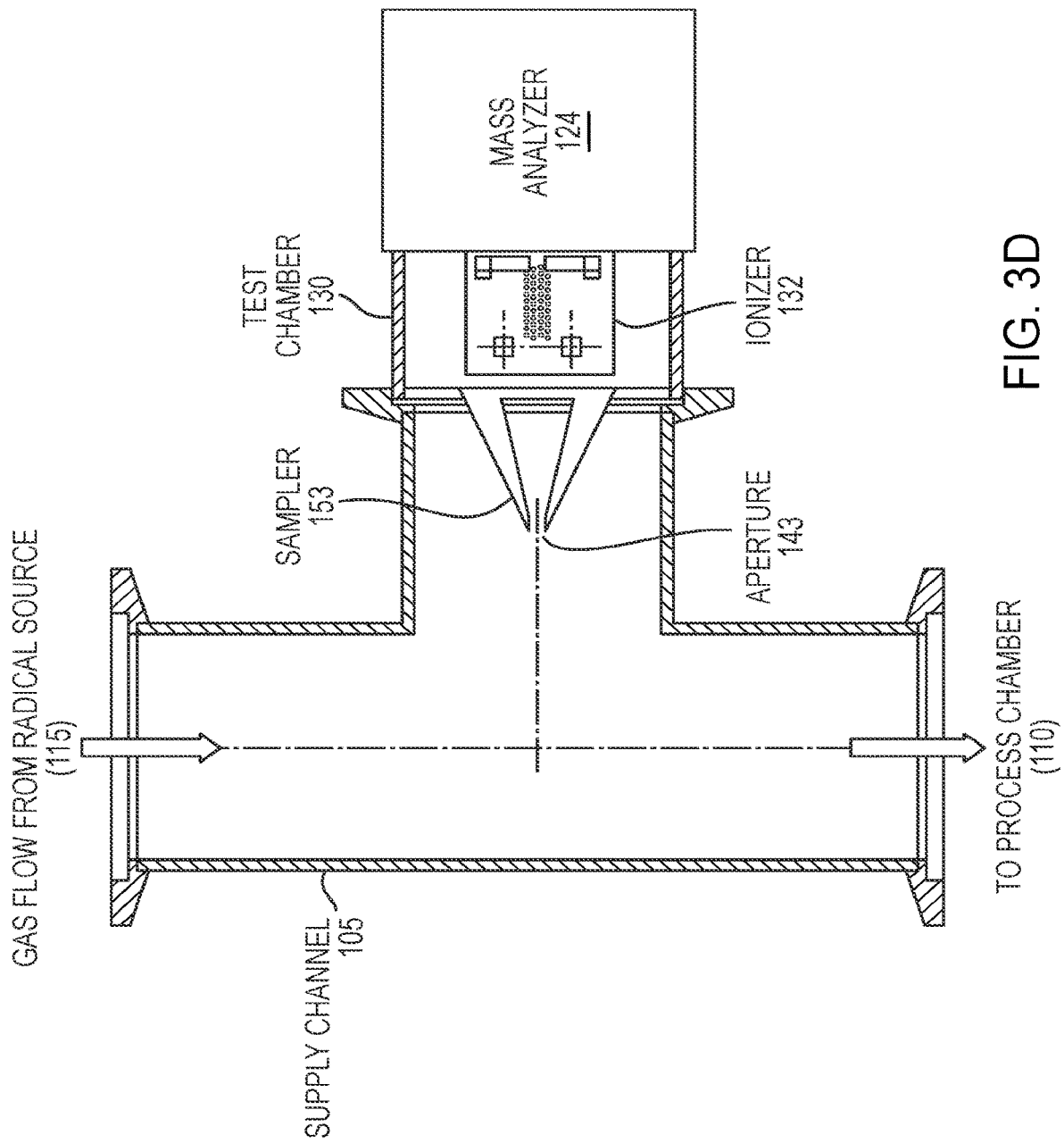

FIGS. 3C and 3D show configurations having samplers 152, 153 resembling the sampler 150 of FIG. 3A, including a conical shape and a respective aperture 142 at the end of the sampler 152. Yet, in contrast to FIG. 3A, the samplers 152, 153 are partially (FIG. 3C) or fully (FIG. 3D) recessed from the wall of the supply channel 105. These configurations may be advantageous in applications where proximity to the supply channel 105 or other flow channel is limited, meaning that the components of the RPM 120 (e.g., ionizer 132 and/or mass spectrometer 122) must be positioned some distance from the flow channel. However, the configurations may also possess further advantages, such as reducing interference with the gas flow through the flow channel and positioning the aperture 142 closer to the ionizer 132 to increase the quantity of ionized radical particles in the test chamber 130.

Figure 3E:
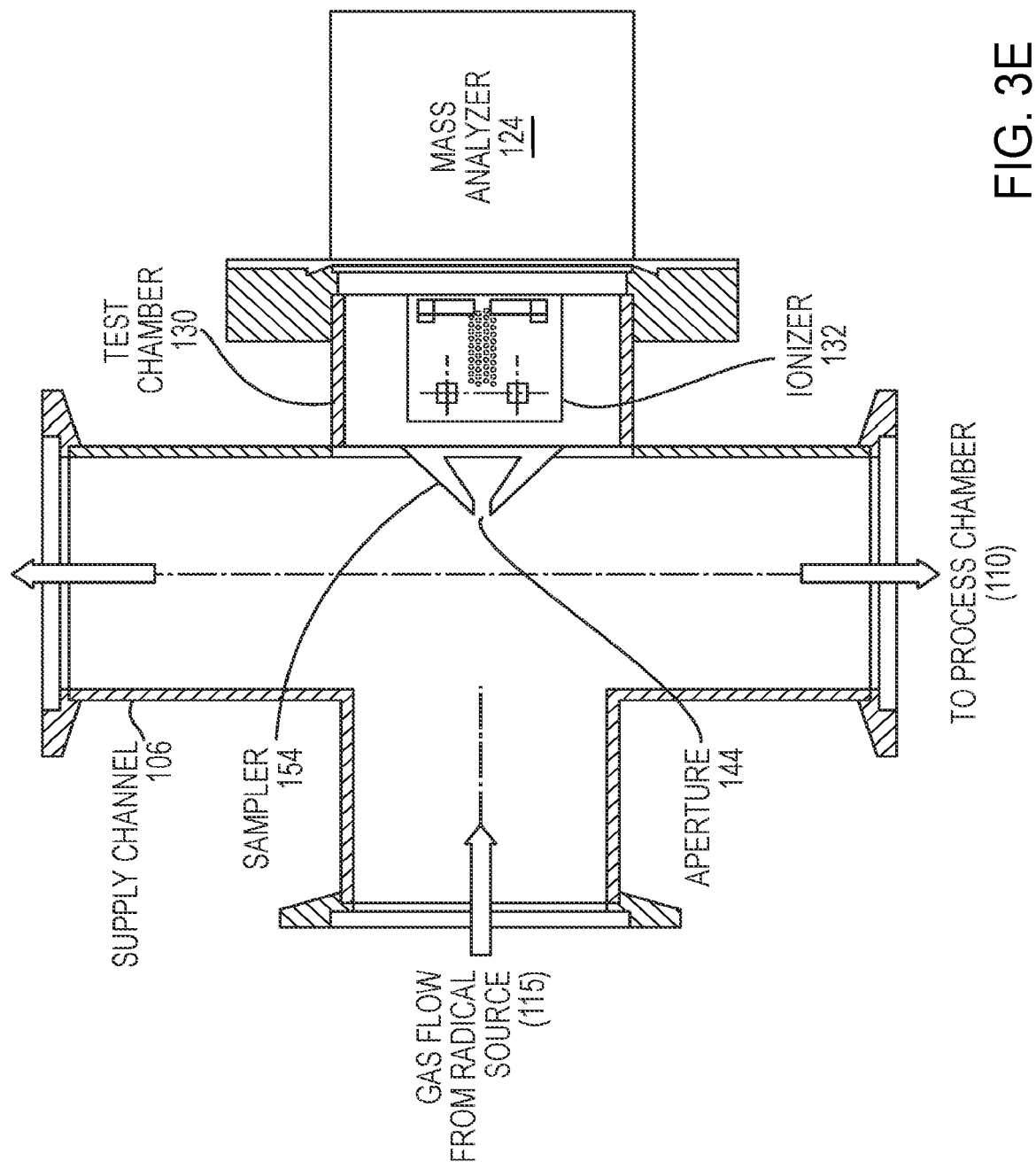

FIG. 3E shows a configuration comparable to that of FIG. 3A, except that a supply channel 106 has a T-shaped structure comprising a single inlet from the radical source 115 and two or more outlets, one or both of which may lead to the process chamber 110, such that the flow is away from the aperture 144, symmetrically. The test chamber 130 is positioned opposite from the inlet of the supply channel 106 to form a cross arrangement, meaning that the aperture 144 at the sampler 154 is aligned on-axis with the path of the gas flow. As a result of this configuration, radical particles from the radical source 115 are more likely to enter the test chamber 130 without prior wall collisions that may cause the particles to react or recombine.

Figure 3F:
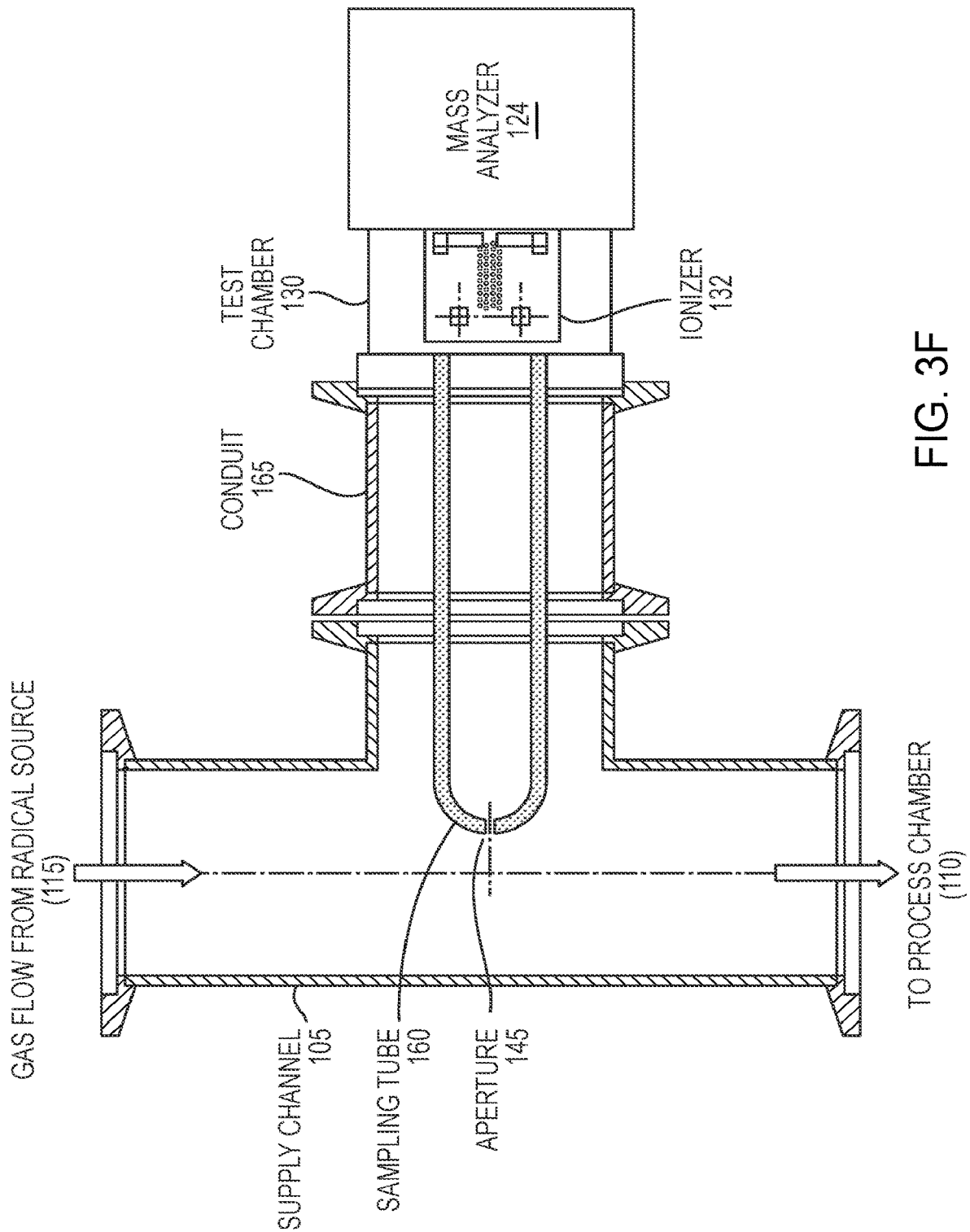

FIG. 3F shows a sampling arrangement in a further configuration. Here, a sampling tube 160 is implemented in place of a sampler as shown in FIGS. 3A and 3C-E. This configuration may be advantageous when some or all of the RPM 120 must be positioned farther away from the flow channel to be sampled. The sampling tube 160 may extend partially into the gas flow of the supply channel 105 as shown, and may extend a distance within a conduit 165 before opening into the test chamber 130. To facilitate transporting radical particles along the interior volume of the sampling tube 160, the sampling tube 160 may be composed of (or coated with) a material that has low reactivity or recombination rate with the radical particle(s) to be measured. For example, the sampling tube 160 may have an interior surface of quartz or sapphire, which exhibit a low recombination rate with N and H radical particles. Alternatively, the sampling tube 160 may have a surface composed of aluminum, stainless steel, glass or comparable material, wherein different surfaces may optimal for minimizing reactions of a given set of radical particles.

FIGS. 4A-C illustrate prefabricated inlet ports 401-403 that can be implemented with a radical particle monitor. The ports 401-403 can be positioned between a flow channel and a test chamber, such as in the embodiments described above with reference to FIGS. 1A-3F, to control the flow of a subset of gas in the flow channel into the test chamber. The port 401 includes a cylindrical plug 450 having an aperture 440 through its center. The aperture 440 may be sized and configured as other apertures described above, and, as shown, may include one or more recesses at one or both sides of the plug 450, which may enable a greater flow of radical particles without reaction. The port 402 includes a sampler 450 defining a disc shape and having a conical shape toward its center, wherein the aperture 441 occupies the end of the conical shape. The sampler 441 may be configured comparably to other samplers described above. The port 403 includes a sampling tube 460 that extends through the port (e.g., a cylindrical plug as in the port 401) and terminates with an aperture 442. The sampling tube 460 may include some or all features of the sampling tube 160 described above with reference to FIG. 3F. Each of the ports 401-403 may be composed of any material suitable for gas transport and vacuum applications, such as stainless steel, and may have one or more surfaces comprised of a material having a low recombination rate and reactions with target radical particles as described above.

Figure 5B:
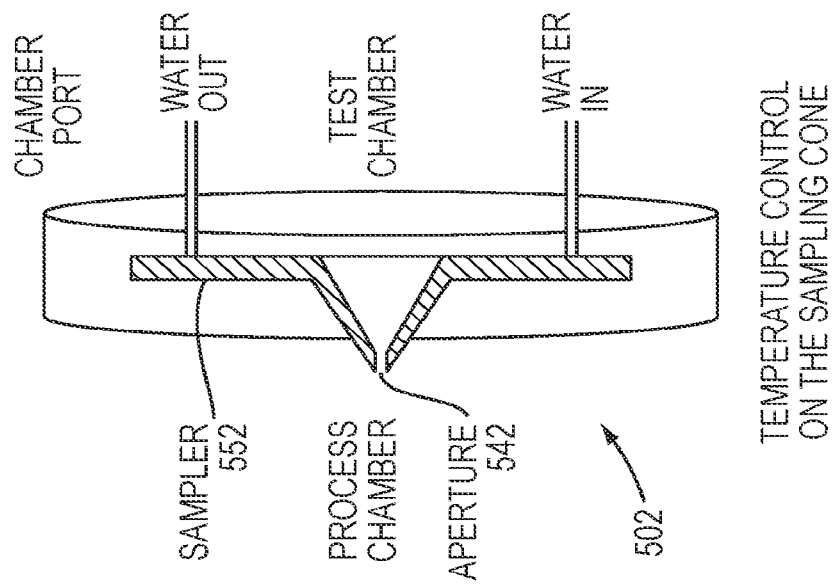
FIGS. 5A-B are diagrams of inlet ports configured for a bias voltage or temperature control.
Figure 5A:
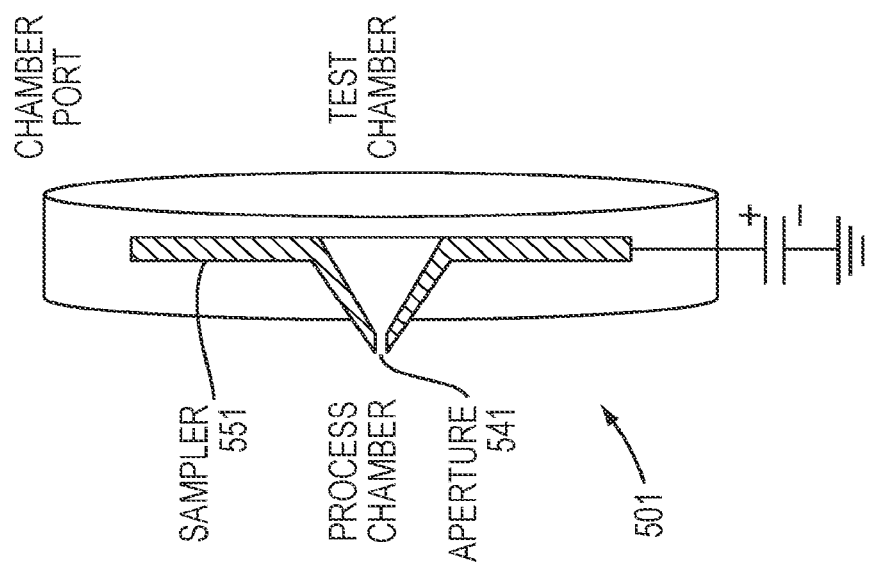

FIGS. 5A-B illustrate inlet ports 501, 502 configured for bias voltage and temperature control features, respectively. At FIG. 5A, the inlet port 501 includes a sampler 551 that is electrically conductive and is coupled to a bias voltage. The bias voltage may cause the sampler 551 to exhibit a charge that repels certain ions and thereby reduces passage of those ions through the aperture 541, reducing ion interference in the adjacent test chamber. The bias voltage can be a positive or negative voltage depending on the targeted ions. For example, a positive bias voltage can repel positive ions such as nitrogen ions ($N^+$), which would interfere with the measurement of nitrogen radical particles. Alternatively, a negative bias voltage can repel negative ions such as fluorine ions (F⁻), which would interfere with the measurement of fluorine radical particles.

Turning to FIG. 5B, the inlet port 502 includes a sampler 552 having one or more internal conduits that are adapted to pass a flow or water or other liquid through the sampler 552, thereby cooling (or, alternatively, heating) the sampler 552 towards a target temperature. During operation of an RPM, radical recombination at the surface of the sampler 552 can impart heat to the sampler 552, raising its temperature and increasing the rate of recombination with subsequent radical particles. By directing a coolant through the sampler 552, the sampler 552 can be maintained at a lower temperature, thereby reducing its recombination rate with radical particles. In further embodiments, a sampler may combine the bias voltage and temperature control features of the samplers 551, 552.

FIGS. 6A-C illustrate example configurations implementing an aperture stopper. When an RPM as described above is not in operation, it may be advantageous to protect the RPM by sealing the aperture between the flow channel and the test chamber, particularly if the gas pressure or temperature in the flow channel is raised significantly. Various mechanical means can be used to selectively seal the aperture. For example, as shown in FIG. 6A, a mechanical throttle valve 670 can be positioned between the sampler 651 and a test chamber. When the throttle valve 670 is actuated, it may form a seal between the sampler 651 and the test chamber, thereby preventing particles from entering the test chamber through the sampler. In FIG. 6B, an automated stopper 680 may reside in a recessed chamber of the flow channel opposite of the sampler 652. When actuated, the stopper 680 moves laterally to seal around the aperture 642, thereby sealing the flow channel from the test chamber opposite the sampler 652. Lastly, in FIG. 6C, illustrates an automated stopper 680 residing within or adjacent to a test chamber. When actuated, the stopper 681 moves toward the aperture 643 until it creates a seal with the sampler 653, thereby sealing the flow channel from the test chamber.

Figure 7:
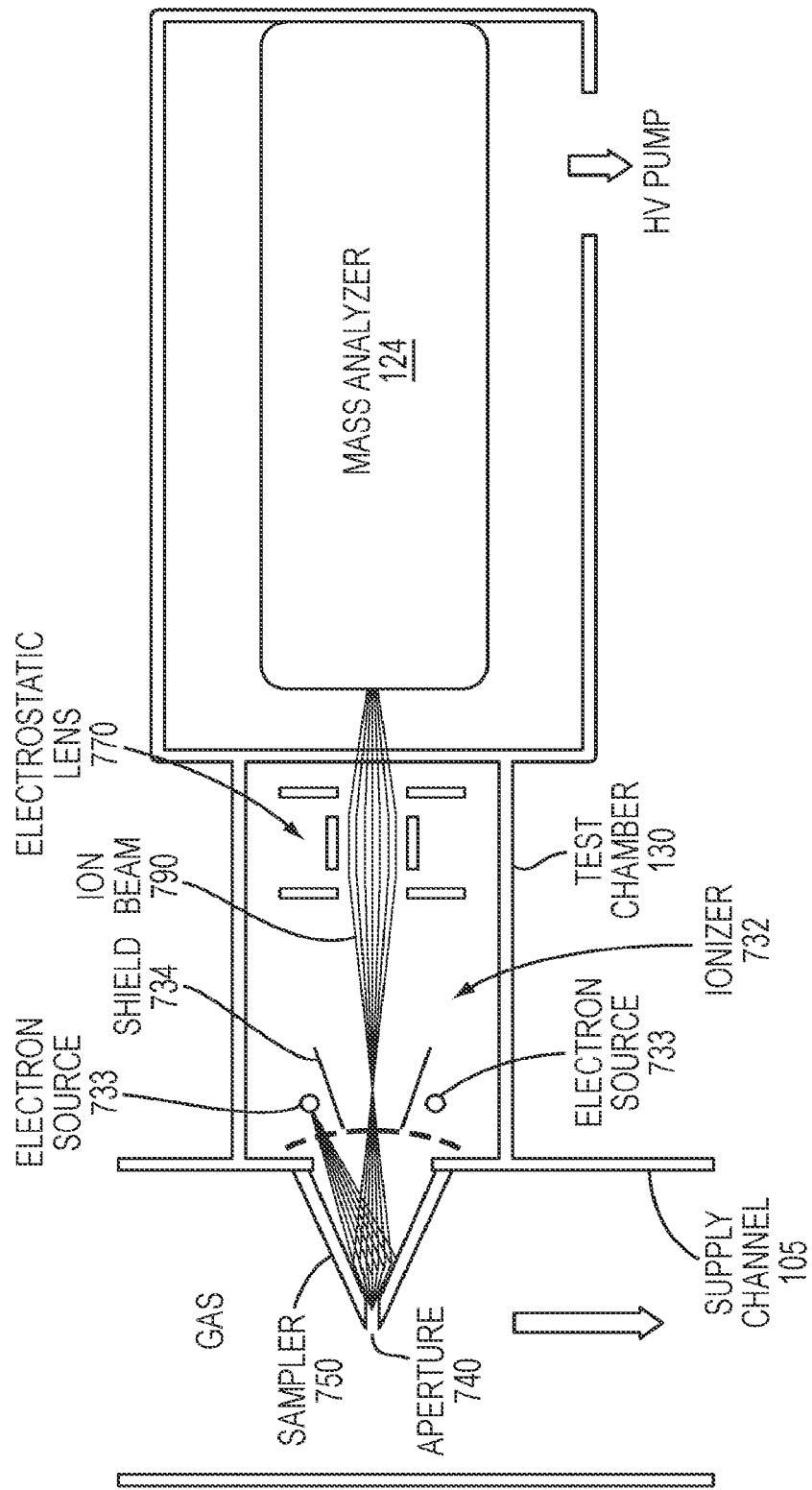
FIG. 7 is a diagram of a subset of a radical particle monitor in a further configuration.

FIG. 7 illustrates a portion of an RPM in a further embodiment. The RPM may include some or all applicable features of the embodiments described above with reference to FIGS. 1A-6C, including a test chamber 130 coupled to a supply channel 105 and a sampler 750 to divert a subset of the gas from the supply channel 105 to the test chamber 130 via an aperture 740. In contrast to the embodiments above, an ionizer 732 is positioned close to the sampler 750 and is configured to ionize the radical particles within the volume defined by the sampler 750 and generate a beam of radical ions 790. To do so, the ionizer 732 may include electron sources 733 and a shield 734. The shield 734, shown in cross-section, may encompass two or more sides of the electron sources 733, and may include slits or orifices between the electron sources 733 and the sampler 750 to direct beams of electrons from the electron sources 733 into the volume of the sampler 750 to a region near the aperture 740.

The electron beams serve to ionize the radical particles within the volume of the sampler 750, generating the ion beam 790, which is directed through another opening in the shield 734 towards a mass analyzer 124 of the RPM. In this configuration, the conical shape of the sampler 750 may serve as an electrostatic element of the ionizer 732. The shield 734 may also encompass other sides of the electron sources 733 to divert electrons from the ion beam 790. The ion beam 790 extends towards the mass analyzer 124, and is focused into an inlet of the mass analyzer 124 by an electrostatic lens 770. The mass analyzer 124 may receive the radical ions of the ion beam 790 and perform mass filtering and ion detection on the radical ions to measure the presence of the radical ions. A controller 126, as described above with reference to FIG. 1A, may then process the measurements from the mass analyzer 124 to generate further results, such as a mass spectrum of the gas, and may be further configured to control operation of the radical source or tool process control parameters of a respective semiconductor processing system based on the results.

Figure 8:
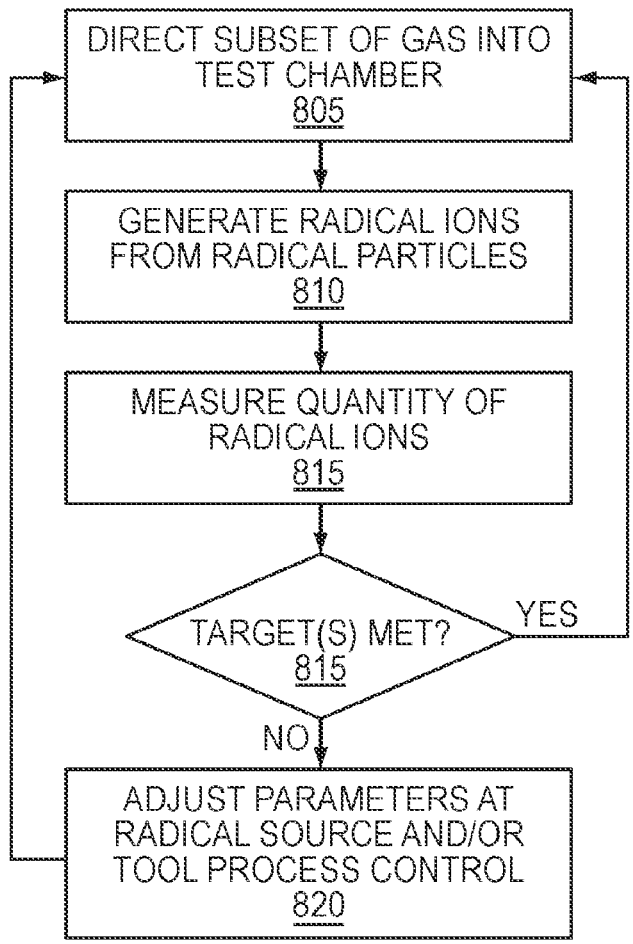
FIG. 8 is a flow diagram of a process of monitoring radical particle concentration in an example embodiment.

FIG. 8 is a flow diagram of a process 800 of monitoring radical particle concentration. The process 800 may be carried out by any of the systems implementing RPMs described above. With reference to the example embodiments in FIGS. 1A and 3A, for a gas flowing through a flow channel such as the supply channel 105, a subset of the gas may be directed into the test chamber 130 via the sampler 150 (805). From the subset of the gas in the test chamber 130, radical ions may be generated from radical particles of the gas (810). To generate the radical ions, the ionizer 132 may operate at a low-energy state, which is lower than an energy state associated with the generation of the non-radical ions of the same mass. The mass analyzer 124 may receive the radical ions of the ion beam 790 and perform mass filtering and ion detection on the radical ions to measure the presence and quantity of the radical ions (815). Different radical particles may be ionized at different energy states. For example, the ionizer 132 may ionize N radicals at 24 eV, while Fluorine radicals require at a different energy state of 21 eV for ionization. Thus, if it is desired to measure the quantity of multiple different radicals in the gas, then the actions 810, 815 may be repeated for each of the radical particles to be measured, changing the energy level of the ionizer 132 between each repetition. For example, the RPM 120 may perform actions 810, 815 for measuring N radicals at 24 eV, and then modify the energy level of the ionizer and repeat actions 810, 815 to measure H radicals at 16 eV. The process may then be repeated multiple additional times, in rapid succession, to measure the quantity of radical particles of N, O, OH, F, H, Cl, NHx, CHx, and NxOy. Thus, the ionizer 132 may operate at a plurality of low-energy states, each of the plurality of low-energy states corresponding to a respective radical particle.

The controller 126 may then compare the measured radial quantities against respective thresholds or target values (815). If the targets are met, then the monitoring may continue as the process is repeated. Otherwise, the controller 126 may communicate with the radical source 115 and/or tool process control to modify operations (820). For example, the controller 126 may control the operation of the radical source 115 or another radical particle source (e.g. source 116) by controlling quantity of radical particle generation over a given time and/or a time period in which the radical particles are generated. Further, the controller 126 may send the feedback to the radical source 115 or 116 to adjust one or more of power, gas flow, gas pressure, and temperature of a wetted path of the flow channel. The controller 126 may send the feedback to the process tool to adjust the process parameters. Such adjustments, made in response to the measured quantity of radical particles, may improve performance of a processing cycle by increasing the quantity of radical particles to a suitable level, or by lengthening the time of a processing cycle to ensure a wafer 112 undergoes sufficient exposure to the radical particles. Following the adjustment (820), the process 800 may be repeated to provide ongoing monitoring of the radical particles in the system 100.

In further embodiments, the process 800 may include a "high-energy" mode for measuring quantities of non-radical particles (e.g., background or reference gas). To carry out the high-energy mode, the RPM 120 may adjust the energy state of the ionizer 132 to a higher energy state, such as 40 eV or 70 eV, and then operate a process comparable to the process 800 described above. In doing so, the RPM 120 may measure the quantities of one or more non-radical particles making up the sampled gas. For example, the RPM 120 may first operate in a "low-energy state" at 15 eV to measure N radical particles. This energy level is too low to ionize certain reference gases such as argon, which has an ionization potential of 15.6 eV. Following this scan, the RPM 120 may then switch to a high-energy state of 40 eV to ionize the argon particles and other reference gases. With suitable mathematical adjustments for relative sensitivities, this signal can be used to normalize, or calibrate, the response of the RPM for the radical ions being measured to ensure precise repeatability of measurements.

While example embodiments have been particularly shown and described, it will be understood by those skilled in the art that various changes in form and details may be made therein without departing from the scope of the embodiments encompassed by the appended claims.

What is claimed is:

1. A radical particle monitor, comprising:
    a tubular flow channel configured to transmit, along an axis thereof, a gas including radicals;
    a test chamber coupled to the flow channel so as to be offset from the axis of the flow channel, wherein an interior of the test chamber and an interior of the flow channel are in fluid communication with one another via an aperture located between the interior of the flow channel and the interior of the test chamber;
    an ionizer positioned within the interior of the test chamber, wherein the ionizer has a line-of-sight with the aperture; and
    a mass analyzer coupled to the test chamber.

2. The radical particle monitor of claim 1, wherein the aperture is formed in a side wall of the flow channel.

3. The radical particle monitor of claim 1, wherein the test chamber includes a sampler extending towards the axis of the flow channel, wherein the aperture is formed in the sampler.

4. The radical particle monitor of claim 3, wherein the sampler extends from a sidewall of the flow channel.

5. The radical particle monitor of claim 3, wherein the sampler is conical.

6. The radical particle monitor of claim 3, wherein the sampler is cylindrical.

7. The radical particle monitor of claim 3, wherein a surface of the sampler is composed of a non-metal material.

8. The radical particle monitor of claim 7, wherein the non-metal material is a material selected from the group consisting of glass, quartz, sapphire, aluminum nitride, aluminum oxide, and $SiO_2$.

9. The radical particle monitor of claim 3, wherein a surface of the sampler is composed of a metal material.

10. The radical particle monitor of claim 9, wherein the metal material is a material selected from the group consisting of aluminum and stainless steel.

11. The radical particle monitor of claim 3, wherein the sampler is electrically conductive and is coupled to a bias voltage source.

12. The radical particle monitor of claim 3, wherein the sampler includes an internal conduit configured to transport a coolant.

13. The radical particle monitor of claim 3, further comprising a conduit coupled between the test chamber and the flow channel, wherein the sampler extends through the conduit.

14. The radical particle monitor of claim 1, wherein the aperture has a diameter less than 1 mm.

15. The radical particle monitor of claim 1, wherein the ionizer is positioned within 4 inches of the aperture.

16. The radical particle monitor of claim 15, wherein the ionizer is positioned within 0.5 inches of the aperture.

17. The radical particle monitor of claim 1, further comprising a stopper configured to selectively seal the aperture.

18. A radical particle monitor for measuring radicals within a semiconductor process chamber, the radical particle monitor comprising:
    a test chamber having an aperture fluidically connecting an interior of the test chamber with an interior of the semiconductor process chamber;
    an ionizer positioned within the interior of the test chamber, wherein the ionizer has a line-of-sight with the aperture; and
    a mass analyzer coupled to the test chamber.

19. The radical particle monitor of claim 18, wherein the aperture is defined by a structure having a surface formed of a material selected from the group consisting of glass, quartz, sapphire, aluminum nitride, aluminum oxide, $SiO_2$, aluminum and stainless steel.

20. The radical particle monitor of claim 17, further comprising a sampler extending into the process chamber, wherein the aperture is formed in the sampler.

* * * * *